(12) United States Patent
Dai et al.

(10) Patent No.: US 9,099,917 B2
(45) Date of Patent: Aug. 4, 2015

(54) CONSTANT CURRENT SOURCE CIRCUIT AND A SAMPLING CIRCUIT

(75) Inventors: Xuewei Dai, Shenzhen (CN); Chunjun Jiang, Shenzhen (CN); Middel Tjaco, Shenzhen (CN); Dezhao Zhang, Shenzhen (CN)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 14/350,816

(22) PCT Filed: Aug. 23, 2012

(86) PCT No.: PCT/EP2012/066434
§ 371 (c)(1),
(2), (4) Date: Jun. 16, 2014

(87) PCT Pub. No.: WO2013/053523
PCT Pub. Date: Apr. 18, 2013

(65) Prior Publication Data
US 2014/0327365 A1    Nov. 6, 2014

(30) Foreign Application Priority Data

Oct. 12, 2011   (CN) .......................... 2011 1 0308907

(51) Int. Cl.
| H05B 37/02 | (2006.01) |
| H02M 3/155 | (2006.01) |
| G05F 3/20 | (2006.01) |
| H05B 33/08 | (2006.01) |

(52) U.S. Cl.
CPC ................ *H02M 3/155* (2013.01); *G05F 3/20* (2013.01); *H05B 33/0809* (2013.01); *H05B 33/0812* (2013.01)

(58) Field of Classification Search
USPC ............. 315/291, 294, 295, 247, 246, 200 R, 315/193, 224
See application file for complete search history.

(56) References Cited

U.S. PATENT DOCUMENTS 7,202,608 B2 *   4/2007   Robinson et al. ............. 315/224
7,781,979 B2 *   8/2010   Lys ............................ 315/185 S

FOREIGN PATENT DOCUMENTS

| CN | 2786682 Y | 6/2006 |
| CN | 201114866 Y | 9/2008 |
| CN | 201215989 Y | 4/2009 |

OTHER PUBLICATIONS

English abstract of CN 2786682 Y dated Jun. 7, 2006.
English abstract of CN 201215989 Y dated Apr. 1, 2009.
English abstract of CN 201114866 Y dated Sep. 10, 2008.
International Search Report issued in the corresponding PCT application No. PCT/EP2012/066434, dated Nov. 11, 2013.

* cited by examiner

*Primary Examiner* — Minh D A

(57) ABSTRACT

A constant current source circuit includes a main circuit, wherein the main circuit includes a first three-terminal regulator, a transistor, a sample resistor and a load, an output terminal of the first three-terminal regulator is connected with a control Electrode of the transistor, a reference Electrode of the transistor is connected with a voltage input terminal, a working Electrode is connected with one end of the load, and the other end of the load is connected with one end of the sample resistor, and the other end of the sample resistor and an input terminal of the first three-terminal regulator are connected to a reference potential, respectively, wherein the constant current source circuit further includes an adjusting unit that includes a voltage stabilizing unit, a fourth resistor and a fifth resistor.

14 Claims, 4 Drawing Sheets

CONSTANT CURRENT SOURCE CIRCUIT AND A SAMPLING CIRCUIT

RELATED APPLICATIONS

The present application is a national stage entry according to 35 U.S.C. §371 of PCT application No.: PCT/EP2012/066434 filed on Aug. 23, 2012, which claims priority from Chinese application No.: 201110308907.0 filed on Oct. 12, 2011, and is incorporated herein by reference in its entirety.

TECHNICAL FIELD

Various embodiments relate to a constant current source circuit and a sampling circuit.

BACKGROUND

Currently, the constant current source circuit has been widely used as circuits demanding a high current stability.

The constant current function is realized by a transistor T2 in the prior art (see FIG. 1). Since VBE of the transistor T2 is 0.7V, a sample voltage passing through a resistor R1 is about 0.6V. A final stable current is I=VBE/R1. The main drawbacks of this circuit are a poor current precision and a high thermal drift, because the transistor has a big VBE range (0.58-0.75V) and a high thermal drift.

The constant current source circuit is realized by a three-terminal shunt regulator U1 in the prior art (see FIG. 2). As shown in FIG. 2, the constant current source circuit comprises the three-terminal shunt regulator U1 and a transistor T1. The three-terminal shunt regulator U1 has an output terminal 2 connected to a voltage input terminal VIN through a resistor R3, an adjusting terminal 1 connected to a node between a sample resistor R1 and an LED as a load, and an input terminal connected to a reference potential. The resistor R3 is connected between a base of the transistor T1 and the voltage input terminal VIN, and the transistor T1 has an emitter connected to the voltage input terminal VIN and a collector connected to the load. The three-terminal regulator U1 may be TL431. As the TL431 is used for the constant current, an output current is controlled by controlling U1 (TL431). As a conduction voltage of TL431 is 2.495V, a voltage passing through the sample resistor is 2.495V, and the power consumption at this time is P=2.495*I. The main drawback of this solution is big power consumption as the sample voltage is as high as 2.495V, and the advantage is a high precision and a low thermal drift.

In the two solutions above, voltages at both ends of the sample resistor are close to a forward voltage drop VF (generally, 0.7-3.1V) of the LED as the load when enabled, resulting big power consumption.

SUMMARY

Various embodiments provide a novel constant current source circuit that may overcome the defects in the prior art and has the advantages such as a high efficiency, a high current precision and a low thermal drift.

Various embodiments provide a constant current source circuit. The constant current source circuit includes a main circuit, wherein the main circuit includes a first three-terminal regulator, a transistor, a sample resistor and a load, an output terminal of the first three-terminal regulator is connected with a control Electrode of the transistor, a reference Electrode of the transistor is connected with a voltage input terminal, a working Electrode is connected with one end of the load, and the other end of the load is connected with one end of the sample resistor, and the other end of the sample resistor and an input terminal of the first three-terminal regulator are connected to a reference potential, wherein the constant current source circuit further includes an adjusting unit that includes a voltage stabilizing unit, a fourth resistor and a fifth resistor, wherein the voltage regulating unit generates a second reference voltage higher than a first reference voltage of the first three-terminal regulator and supplies the second reference voltage to an adjusting terminal of the first three-terminal regulator through the fourth resistor, and the fifth resistor is connected between an adjusting terminal of the first three-terminal regulator and a node that is between the load and the sample resistor.

According to various embodiments, the voltage stabilizing unit, the fourth resistor and the fifth resistor of the regulating unit constitute a circuit affecting a sample voltage of the sample resistor. A relation between the sample voltage $V_{R1}$ of the sample resistor, the first reference voltage VF of the first three-terminal regulator and the second reference voltage VF1 is: $VF=(VF1*R5+V_{R1}*R4)/(R4+R5)$. The value of $V_{R1}$ may be reduced as much as possible by selecting different reference voltages of the first three-terminal regulator and the voltage regulating unit and different resistance values of the fourth resistor and the fifth resistor, so that unnecessary power consumption of the sample resistor will be reduced, and the power of the whole constant current source circuit will be improved. A regulator with a low thermal drift may be used as the second three-terminal regulator, for assuring to supply a reference voltage with a good thermal drift performance to the adjusting terminal of the first three-terminal regulator.

Preferably, the constant current source circuit further includes a third resistor, the output terminal of the first three-terminal regulator is connected with the voltage input terminal through the third resistor, and the third resistor is connected between the control Electrode of the transistor and the voltage input terminal for a better voltage reducing function.

Preferably, the voltage regulating unit is a second three-terminal regulator that has an adjusting terminal connected with the adjusting terminal of the first three-terminal regulator through the fourth resistor, an output terminal connected with the voltage input terminal, and an input terminal connected with the reference potential. The second three-terminal regulator may be selected to well cooperate with the first three-terminal regulator.

When the voltage regulating unit is the second three-terminal regulator, the constant current source circuit preferably further includes a second resistor, through which the output terminal of the second three-terminal regulator is connected with the voltage input terminal for a better voltage reducing function.

Preferably, the second three-terminal regulator is TL431 which is a three-terminal shunt regulator with a good thermal stability and a high precision. Preferably, the second three-terminal regulator has the adjusting terminal and the output terminal thereof short connected, i.e., no resistor between the adjusting terminal and the output terminal and both have the same potential, so that an output voltage of TL431 is 2.5V, equivalent to a reference voltage thereof.

In another embodiment, the voltage regulating unit is a Zener Diode that has one end connected with the adjusting terminal of the first three-terminal regulator through the fourth resistor and the other end connected with the reference potential.

Preferably, the first three-terminal regulator is LM317 which is a three-terminal serial regulator. By observing a current passing through the sample resistor, the transistor is turned on and off selectively by LM317 for a constant current output by feedback.

Preferably, the load is an LED that has an Anode connected with the working Electrode of the transistor and a Cathode connected to one end of sample resistor. Thus, the LED works at a highly precise constant current. And further preferably, the load is a plurality of LEDs in serial connection.

The constant current source circuit of the present disclosure has the advantages of a high efficiency, a high current precision and a favorable thermal drift performance.

Various embodiments further relate to a sampling circuit, for a DC-DC switch converter, that includes a main circuit, wherein the main circuit includes a load having one end connected with a voltage input terminal and the other end connected with one end of a sample resistor, the other end of the sample resistor is connected with a reference potential, wherein the sampling circuit further includes an adjusting unit, and the adjusting unit includes a voltage stabilizing unit, a fourth resistor and a fifth resistor, wherein the voltage stabilizing unit generates a reference voltage and supplies the reference voltage to a sampling circuit output terminal through the fifth resistor, and the fourth resistor is connected between the sampling circuit output terminal and a node that is between the load and the sample resistor. The sampling circuit according to the present disclosure utilizes, for instance, the concept of the constant current source circuit of the present disclosure, i.e., the adjusting unit is added, and the voltage stabilizing unit, the fourth resistor and the fifth resistor of the adjusting unit constitute a circuit that adjusts voltages at both ends of the sample resistor and an voltage at the sampling circuit output terminal. Accordingly, a relation between the sample voltage $V_{R1}$ of the sample resistor, the output voltage VF at the sampling circuit output terminal and the reference voltage VF1 of the voltage regulating unit is $VF=(VF1*R4+V_{R1}*R5)/(R4+R5)$, wherein $V_{R1}=I*R1$.

Preferably, the voltage regulating unit is a three-terminal regulator that has an adjusting terminal connected with the sampling circuit output terminal through the fifth resistor, an output terminal connected with the voltage input terminal, and an input terminal connected with the reference potential.

Preferably, the sampling circuit further includes a second resistor, through which the output terminal of the three-terminal regulator is connected with the voltage input terminal.

Preferably, the three-terminal regulator has the adjusting terminal short connected to the output terminal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments.

DETAILED DESCRIPTION

The following detailed description refers to the accompanying drawing that show, by way of illustration, specific details and embodiments in which the disclosure may be practiced.

Figure 1:
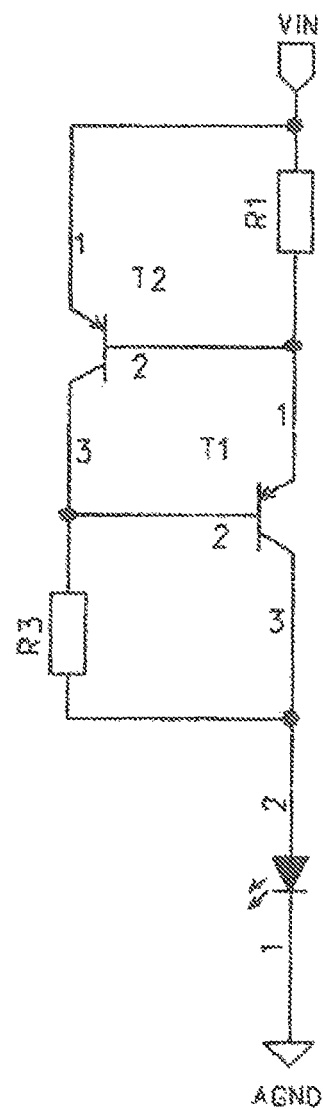
FIG. 1 is a first constant current source circuit in prior art.
Figure 2:
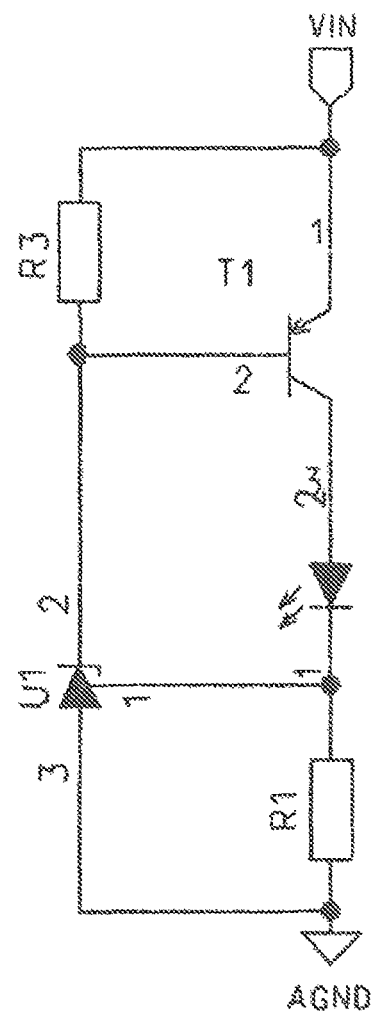
FIG. 2 is a second constant current source circuit in prior art.
Figure 3:
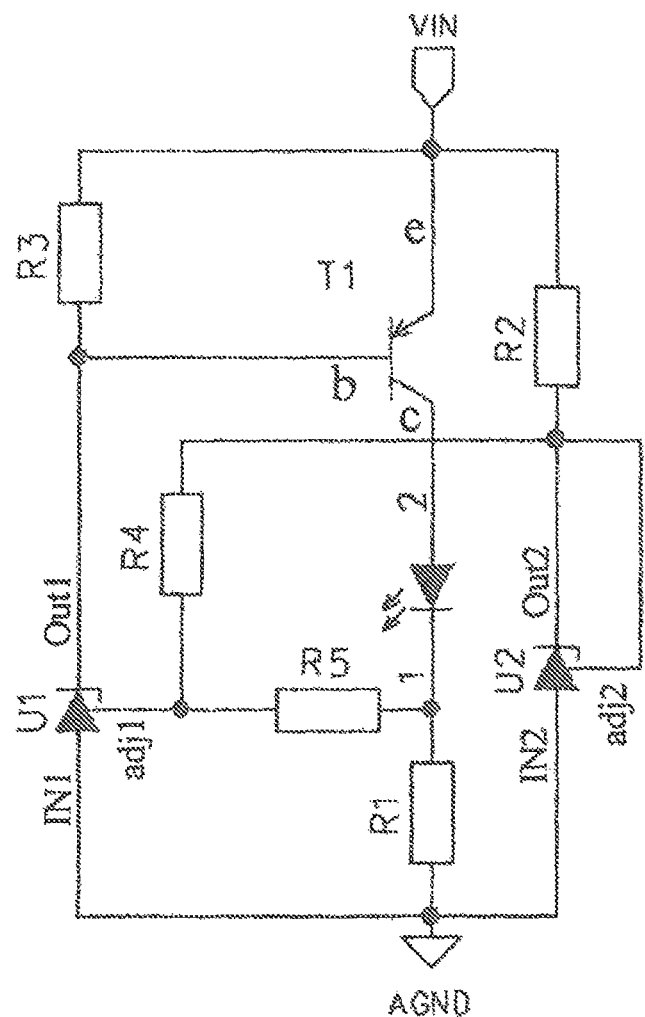
FIG. 3 is an embodiment of a constant current source circuit according to the present disclosure.

FIG. 3 is an embodiment of a constant current source circuit according to the present disclosure. As shown in FIG. 3, the constant current source circuit comprises a main circuit and an adjusting unit, wherein the main circuit comprises a transistor T1, a plurality of LEDs in serial connection as a load, a first three-terminal regulator U1, a sample resistor R1 and a third resistor R3, and the adjusting unit comprises a second three-terminal regulator U2 as a voltage stabilizing unit, a second resistor R2, a fourth resistor R4 and a fifth resistor R5.

An output terminal Out1 of the first three-terminal regulator U1 is connected with a voltage input terminal VIN through the third resistor R3, and the third resistor R3 is connected between a base b of the transistor T1 and the voltage input terminal VIN. An emitter e of the transistor T1 is connected with the voltage input terminal VIN, and a collector c of the transistor T1 is connected with a Anode of the LEDs in serial connection as the load. Collector is working Electrode and emitter is reference Electrode and base is control Electrode. The transistor T1 can be P-N-P transistor or N-P-N transistor.

The sample resistor R1 reflecting an output current, forms a feedback network with the transistor T1 and the first three-terminal regulator U1 so as to keep on outputting a constant current. Specifically, the working principle of the constant current source circuit is: when an input voltage is increased and increases a current flowing through the transistor T1, the load and the sample resistor R1, if the current flowing through the sample resistor R1 is higher than a set value, the first three-terminal regulator U1 is turned on, a voltage applied to the base b of the transistor T1 is reduced, the transistor T1 is disabled, and an output current is reduced; and when the current flowing through the sample resistor R1 is smaller than the set value, the first three-terminal regulator U1 is turned off, the transistor T1 is enabled, and the output current is increased. A stable state is achieved after such circulation, and a final stable current is $I=V_{R1}/R1$.

The adjusting unit is provided in the present disclosure in order to reduce unnecessary power consumption. The adjusting unit supplies a stable voltage feedback to the first three-terminal regulator U1 and reduces a voltage drop in the sample resistor R1. In the present embodiment, the adjusting unit comprises the second three-terminal regulator U2, the second resistor R2, the fourth resistor R4 and the fifth resistor R5. Two or more three-terminal regulators are mainly used in present embodiment, i.e., at least one extra second three-terminal regulator U2 is added. The second three-terminal regulator U2 generates a second reference voltage for supplying a stable voltage feedback to the first three-terminal regulator U1. The second three-terminal regulator U2 has an adjusting terminal adj2 connected to an adjusting terminal adj1 of the first three-terminal regulator U1 through the fourth resistor R4 so as to supply a stable voltage feedback to the first three-terminal regulator U1, an output terminal Out2 connected with the voltage input terminal VIN through the second resistor R2, an input terminal IN2 connected to a reference potential AGND, and the fifth resistor R5 is connected between an adjusting terminal adj1 of the first three-terminal regulator U1 and a node that is between the load and the sample resistor R1.

In this circuit, a voltage between the adjusting terminal adj1 and an input terminal IN1 of the first three-terminal regulator U1 is VF, i.e., Vadj1−VIN1=VF, which is the voltage applied to R5 and R1, respectively, at which time, a relation between VF and $V_{R1}$ is $V_{R1}=VF*R1/(R1+R5)$, i.e., $R1=V_{R1}*R5/(VF-V_{R1})$; a voltage between the adjusting terminal adj2 and an input terminal IN2 of the second three-terminal regulator U2 is VF1, i.e., Vadj2−VIN2=VF1. Therefore, a voltage drop through R4, R5 and R1 is VF1, at which time, a relation between VF1 and $V_{R1}$ is $V_{R1}=VF1*R1/(R1+R4+R5)$, i.e., $R1=(R4*V_{R1}+R5*V_{R1})/(VF1-V_{R1})$. As a result, an equation $VF=(VF1*R5+V_{R1}*R4)/(R4+R5)$ is obtained.

In this embodiment, the three-terminal adjustable serial regulator LM317 U1 is used as the first three-terminal regulator U1 and the three-terminal adjustable shunt regulator TL431 is used as the second three-terminal regulator U2. The LM317 is a three-terminal adjustable precision serial reference regulator of National Semiconductor, and has a reference voltage of 1.25V. The TL431 is a three-terminal adjustable precision shunt reference regulator of TI. In the present disclosure, as the adjusting terminal adj2 and the output terminal Out2 of the TL431 have the same potential, i.e., there is no resistor between the adjusting terminal adj2 and the output terminal Out2, an output voltage is 2.5V which is equivalent to a reference voltage VF1.

When the TL431 is used, VF1=2.5V, and when the LM317 is used, VF1=1.25V, and then $VF=(VF1*R5+V_{R1}*R4)/(R4+R5)$ according to the equation above. When R5=1K and R4=1.08K, it may be calculated to obtain $V_{R1}$=0.1V. As voltages applied to both ends of the sample resistor R1 are small, the power loss caused by the sample resistor R1 is small when the load LEDs works.

Different from the first embodiment, other three-terminal regulators such as LM117 and LM217 also may be used as the first three-terminal regulator.

Different from the first embodiment, the second three-terminal regulator may be replaced by Zener Diode.

Figure 4:
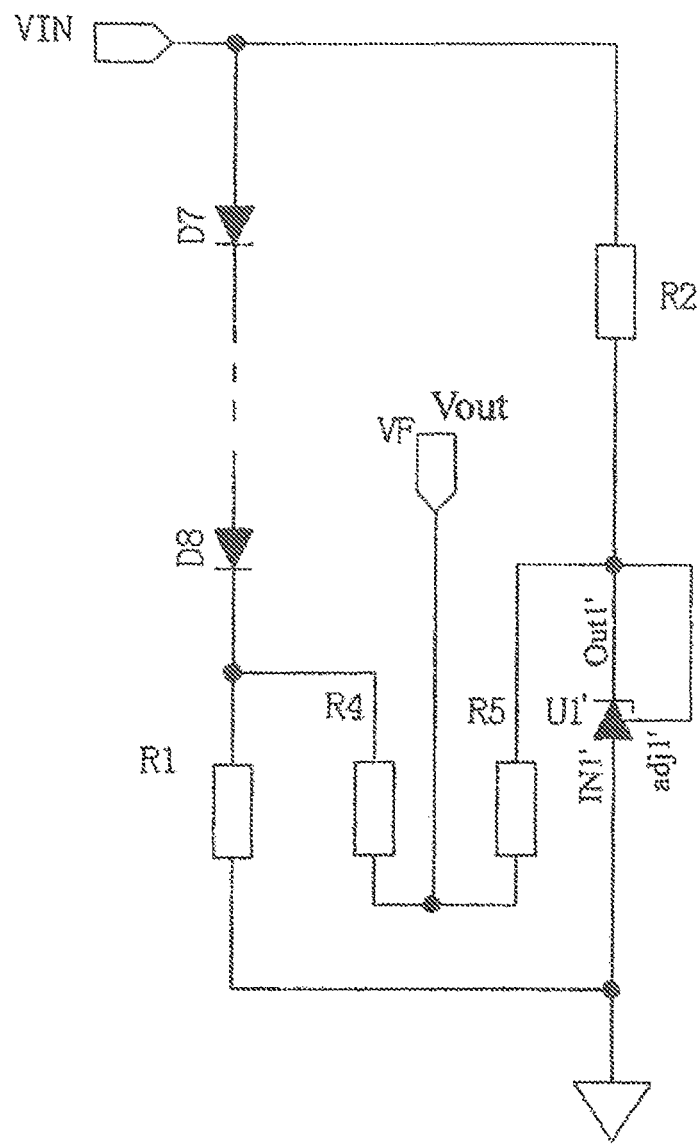
FIG. 4 is an embodiment of a sampling circuit according to the present disclosure.

FIG. 4 is an embodiment of a sampling circuit according to the present disclosure. Similar to the concept of the constant current source circuit of the present disclosure, an adjusting unit is added in addition to the main circuit. The adjusting unit comprises a voltage stabilizing unit, a fourth resistor R4, a second resistor and a fifth resistor R5, wherein the voltage regulating unit U1' generates a reference voltage and supplies the reference voltage to a sampling circuit output terminal VOUT through the fifth resistor R5, and the fourth resistor R4 is connected between an adjusting terminal adj1' of the voltage regulating unit U1' and a node that is between the load and the sample resistor R1. Different from the constant current source circuit of the present disclosure, the main circuit of the sampling circuit merely comprises the LED(s) as the load and the sample resistor R1. The load has one end connected to a voltage input terminal VIN and the other end connected to one end of the sample resistor R1. A relation, calculated in the present embodiment, between VR1, the voltage VF at the sampling circuit output terminal VOUT and the reference voltage VF1 is $VF=(VF1*R5+V_{R1}*R4)/(R4+R5)$. Specifically, the voltage regulating unit U1' is a three-terminal regulator that has the adjusting adj1' is connected with the sampling circuit output terminal VOUT through the fifth resistor R5, an output terminal Out1' connected to the voltage input terminal VIN, and an input terminal IN1' connected with a reference potential AGND. The adjusting terminal adj1' of the three-terminal regulator U1' has the adjusting adj1' thereof short connected to the output terminal Out1' thereof.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS

T1 transistor
U1 first regulator
U2 second regulator
R1 sample resistor
R2 second resistor
R3 third resistor
R4 fourth resistor
R5 fifth resistor

The invention claimed is:

1. A constant current source circuit comprising a main circuit, wherein the main circuit comprises a first three-terminal regulator, a transistor, a sample resistor and a load, an output terminal of the first three-terminal regulator is connected with a control Electrode of the transistor, a reference Electrode of the transistor is connected with a voltage input terminal, a working Electrode is connected with one end of the load, and the other end of the load is connected with one end of the sample resistor, and the other end of the sample resistor and an input terminal of the first three-terminal regulator are connected to a reference potential, respectively, wherein the constant current source circuit further comprises an adjusting unit that comprises a voltage stabilizing unit, a fourth resistor and a fifth resistor, wherein the voltage stabilizing unit generates a second reference voltage higher than a first reference voltage of the first three-terminal regulator and supplies the second reference voltage to an adjusting terminal of the first three-terminal regulator through the fourth resistor, and the fifth resistor is connected between the adjusting terminal of the first three-terminal regulator and a node that is between the load and the sample resistor.

2. The constant current source circuit according to claim 1 further comprising a third resistor, wherein the output terminal of the first three-terminal regulator is connected with the voltage input terminal through the third resistor, and the third resistor is connected between the control Electrode of the transistor and the voltage input terminal.

3. The constant current source circuit according to claim 1, wherein the voltage stabilizing unit is a second three-terminal regulator that has an adjusting terminal connected with an adjusting terminal of the first three-terminal regulator through the fourth resistor, an output terminal connected with the voltage input terminal, and an input terminal connected with the reference potential.

4. The constant current source circuit according to claim 3 further comprising a second resistor, through which the output terminal of the second three-terminal regulator is connected with the voltage input terminal.

5. The constant current source circuit according to claim 3, wherein the second three-terminal regulator is TL431.

6. The constant current source circuit according to claim 5, wherein the second three-terminal regulator has the adjusting terminal thereof short connected to the output terminal thereof.

7. The constant current source circuit according to claim 1, wherein the voltage regulating unit is a Zener Diode that has one end connected with the adjusting terminal of the first three-terminal regulator through the fourth resistor and the other end connected with the reference potential.

8. The constant current source circuit according to claim 1, wherein the first three-terminal regulator is LM317.

9. The constant current source circuit according to claim 1, wherein the load is an LED that has a Anode connected with the working Electrode of the transistor and a Cathode connected to one end of sample resistor.

10. The constant current source circuit according to claim 9, wherein the load is a plurality of LEDs in serial connection.

11. A sampling circuit, for a DC-DC switch converter, comprising a main circuit, wherein the main circuit comprises a load having one end connected with a voltage input terminal and the other end connected with one end of a sample resistor, the other end of the sample resistor is connected with a reference potential, wherein the sampling circuit further comprising an adjusting unit, and the adjusting unit comprises a voltage stabilizing unit, a fourth resistor and a fifth resistor, wherein the voltage stabilizing unit generates a reference voltage and supplies the reference voltage to a sampling circuit output terminal through the fifth resistor, and the fourth resistor is connected between the sampling circuit output terminal and a node that is between the load and the sample resistor.

12. The sampling circuit according to claim 11, wherein the voltage stabilizing unit is a three-terminal regulator that has an adjusting terminal connected with the sampling circuit output terminal through the fifth resistor, an output terminal connected with the voltage input terminal, and an input terminal connected with the reference potential.

13. The sampling circuit according to claim 12 further comprising a second resistor, through which the output terminal of the three-terminal regulator is connected with the voltage input terminal.

14. The sampling circuit according to claim 12, wherein the three-terminal regulator has the adjusting terminal short connected to the output terminal.

* * * * *